March 10, 1931.  H. R. EILERTSEN  1,795,646
MOTOR CONTROL
Filed June 9, 1928
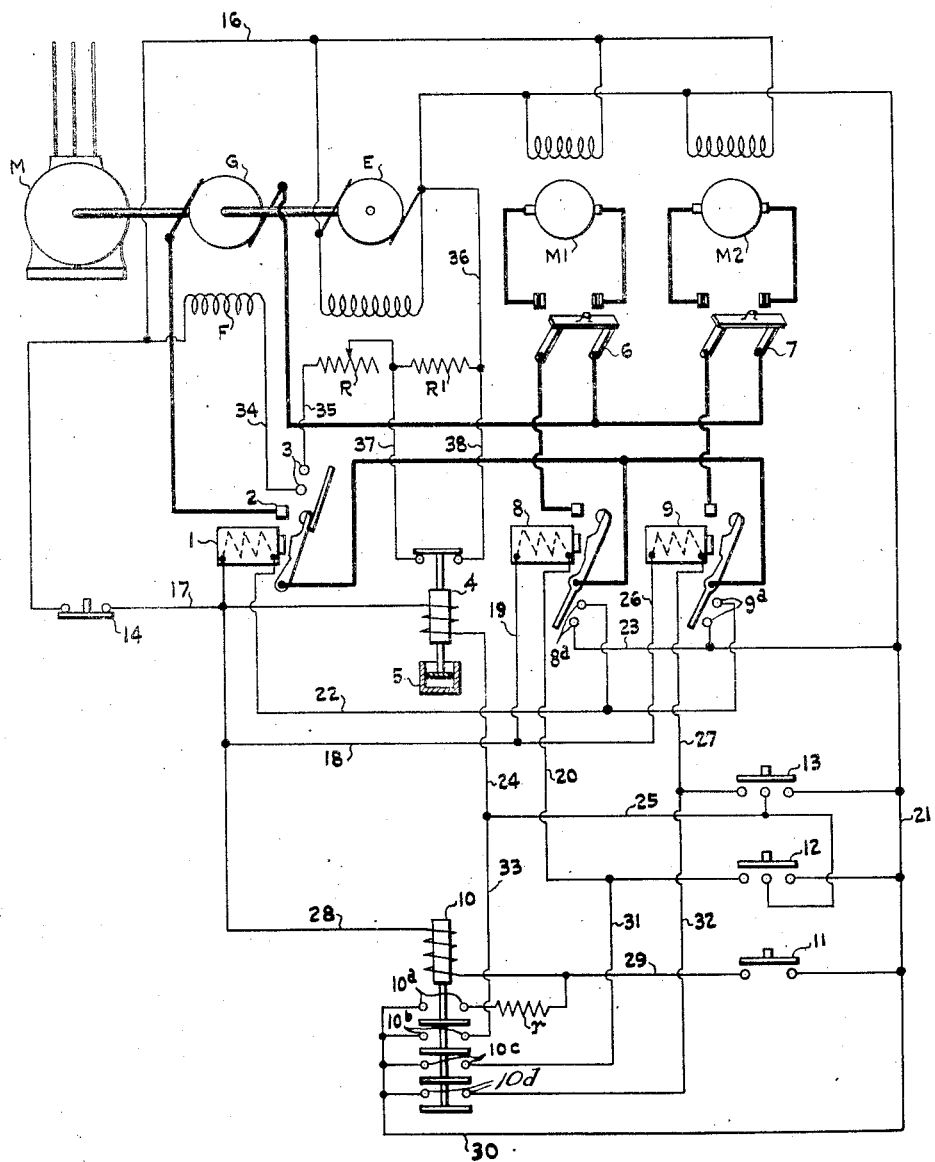
INVENTOR
Henry R. Eilertsen.
BY
A. TORNEY.

Patented Mar. 10, 1931

1,795,646

UNITED STATES PATENT OFFICE

HENRY R. EILERTSEN, OF SOUND BEACH, CONNECTICUT, ASSIGNOR, BY MESNE ASSIGNMENTS, TO CUTLER-HAMMER INC., OF MILWAUKEE, WISCONSIN, A CORPORATION OF DELAWARE

MOTOR CONTROL

Application filed June 9, 1928. Serial No. 284,097.

This invention relates to improvements in motor control.

More particularly, the invention relates to improvements in variable voltage systems of control for one or more motors.

The invention has among its objects to provide for high torque starting of the controlled motor or motors by increasing the field strength of the supply generator and to provide for automatic field weakening of the generator for a reduced voltage following starting of the controlled motor or motors.

A further object is to provide for temporary reduction of the impedance of the field circuit of the supply generator when initially completed whereby the generator field strength will build up more rapidly to the value desired for starting the controlled motor or motors.

Other objects and advantages of the invention will hereinafter appear.

The accompanying drawing illustrates diagrammatically one embodiment of the invention which will now be described, it being understood that the system illustrated may be modified in various respects without departing from the scope of the appended claims.

The system illustrated comprises a generator G driven by an induction motor M, controlled motors $M^1$ and $M^2$ to be supplied by the generator and an exciter E driven by motor M to supply the field windings of machines G, $M^1$ and $M^2$ and also certain control instrumentalities hereinafter described. The field windings of motors $M^1$ and $M^2$ are shown connected in parallel directly across the exciter E, but as will be understood these field windings may in practice be provided with rheostats or other control means to afford regulation of the speeds of said motors.

The generator field F has in circuit therewith a rheostat R to afford regulation thereof at will, and a resistance $R^1$ which is normally excluded from circuit, and which, as will appear, is adapted to be included in circuit following starting of either motor. As will be understood, the total desired resistance might be incorporated in rehostat R, any desired portion of said resistance being used in lieu of resistance $R^1$. Also, as will be understood, the generator field may in practice be provided with reversing connections, although for simplicity of illustration said field is shown as non-reversible.

The generator control means comprises an electro-responsive switch 1 having main contacts 2 in circuit between the generator armature and motors $M^1$ and $M^2$ and auxiliary contacts 3 to complete the field circuit of the generator upon response of said switch to engage its main contacts. Also, the generator control means comprises an electroresponsive relay 4 normally short-circuiting the resistance $R^1$, said relay having a dash pot 5 or other preferred means for delaying its operation when energized.

As will appear, relay 4 is not energized until the generator connections are established and one or more of the motors connected to the generator, with the result that the generator will be caused to subject the controlled motor or motors to a relatively high voltage for starting. Also, as will be apparent, exclusion of the resistance $R^1$ reduces the impedance of the field circuit of the generator whereby the generator field strength will build up more quickly to the value desired. On the other hand, the relay, as will hereinafter appear, is energized at the instant of completing the generator and motor connections aforementioned and accordingly said relay will function after a temporary period to include resistance $R^1$ for reduction of the generator voltage as is desired after starting of the controlled motor or motors. In this connection it is to be understood that relay 4 is designed and adjusted to afford an opportunity for the generator field strength to build up and for the controlled motor or motors to start prior to inclusion of resistance $R^1$. Also, it is to be understood that any other preferred means might be employed for automatically including resistance $R^1$ following starting of the controlled motor or motors.

The controlled motors $M^1$ and $M^2$ are respectively provided with knife switches 6 and 7 and with electroresponsive switches 8 and 9. The knife switches are of the double pole type and provide for complete disconnection of the armature of either motor at will while the switches 8 and 9 provide for connecting either motor, assuming closure of its respective knife switch.

The remaining control instrumentalities comprise an electroresponsive relay 10, a push button switch 11 controlling said relay to effect starting and running of motors $M^1$ and $M^2$ or either of the same according to the settings of the knife switches 6 and 7, push buttons 12 and 13 to effect inching operations of motors $M^1$ and $M^2$ selectively, and a stop push button switch 14.

Assuming depression of push button switch 12 circuit may be traced from the left hand side of the exciter by conductor 16 through push button switch 14 by conductors 17, 18 and 19 through the winding of switch 8 by conductor 20 through push button switch 12 by conductor 21 to the right hand side of the exciter. Switch 8 is thus caused to respond to connect motor $M^1$ across the lines supplied by the generator, assuming prior closure of knife switch 6. Also, switch 8 through its auxiliary contacts $8^a$ completes an energizing circuit for switch 1 causing said switch to respond to complete the armature and field connections of the generator. This circuit may be traced from push button switch 14 by conductor 17 through the winding of switch 1 by conductor 22 through the auxiliary contacts $8^a$ of switch 8 by conductor 23 to conductor 21.

Depression of push button switch 12 also establishes a circuit from push button switch 14 by conductor 17 through the operating winding of relay 4 by conductors 24 and 25 through push button switch 12 to conductor 21. Accordingly following establishment of the connections of motor $M^1$ relay 4 is caused to respond subject to the time element of dash pot 5, with the results aforedescribed.

Assuming depression of push button switch 13 circuit may be traced from the left hand side of the exciter through push button switch 14 by conductors 17, 18 and 26 through the winding of switch 9 by conductor 27 through push button switch 13 by conductor 21 to the right hand side of the exciter. Thus switch 9 is caused to respond to connect motor $M^2$ across the lines supplied by the generator assuming previous closure of knife switch 7 and switch 9 in closing, like switch 8, completes the energizing circuit of the generator control switch 1. This circuit may be traced through push button switch 14 and the winding of switch 1 by conductor 22 as aforedescribed and thence through auxiliary contacts $9^a$ of switch 9 by conductor 23 to conductor 21.

Also, depression of push button switch 13 completes the energizing circuit of relay 4 with the results aforedescribed. The energizing circuit of relay 4 may be traced from push button switch 14 through the winding of said relay as aforedescribed and thence by conductors 24 and 25 through push button switch 13 to conductor 21.

As will be understood, the push button switches 12 and 13 effect continued operation of their respective motors only so long as said switches are held depressed. Each of these switches when released effects deenergization of all windings previously energized thereby, including the windings of the generator control switch 1 and relay 4.

Push button switch 11 when depressed completes a circuit from the left hand side of the exciter through push button switch 14 by conductor 28 through the winding of relay 10 by conductor 29 through said push button switch 11 to conductor 21 and thence back to the exciter. Relay 10 is thus caused to respond and the same upon responding completes for itself a maintaining circuit extending from conductor 29 through a resistance $r$ and contacts $10^a$ of said relay by conductor 30 to conductor 21. Thus the relay will remain energized upon release of push button switch 11.

Relay 10 when energized also establishes energizing circuits for the motor control switches 8 and 9 and relay 4, and through energization of switches 8 and 9 provides for energization of the generator control switch, as heretofore described. The energizing circuit for the winding of switch 8 may be traced from the exciter through said winding to conductor 20, as heretofore described, and thence by conductor 31 through contacts $10^c$ of relay 10 by conductors 30 and 21 back to the exciter. The energizing circuit of switch 9 may be traced from the exciter through the winding of said switch to conductor 27 as heretofore described and thence by conductor 32 through the contacts $10^d$ of relay 10 by conductors 30 and 21 back to the exciter. The energizing circuit for relay 4 may be traced from conductor 24 by conductor 33 through contacts $10^b$ of relay 10 by conductors 30 and 21 to the exciter.

Thus upon depression of push button switch 11 either or both motors may be started, according to the settings of the knife switches 6 and 7 and the connected motor or motors will continue to operate upon release of the push button switch 11. On the other hand, all of the electroresponsive switches may be deenergized at will for stopping by depression of the stop push button switch 14.

As will be obvious, the generator field circuit may be traced from the left hand side of the exciter by conductor 16 to and through the field F by conductor 34 through the auxiliary contacts 3 of switch 1 by conductor 35 through rheostat R and resistance $R^1$ by conductor 36 to the right hand side of the exciter, or alternatively from the rheostat R by conductor 37 through the contacts of relay 4 by conductors 38 and 36 to the right hand side of the exciter.

What I claim as new and desire to secure by Letters Patent is:

1. In a variable voltage system of motor control, in combination, a generator having its field normally disconnected from circuit, means for completing the field circuit of said generator and for establishing a motor circuit to be supplied by said generator and field regulating means for said generator insuring a strengthened field upon establishment of the aforementioned circuits, said field regulating means being operable for field weakening after a predetermined interval of time.

2. In a variable voltage system of motor control, in combination a generator, a plurality of motors, means to establish circuit between said generator and said motors selectively and automatic field regulating means for said generator controlled by the former means for affording a strengthened field of the generator for starting of any one of said motors and for thereafter effecting field weakening automatically subject to a definite time delay.

3. In a variable voltage system of motor control, in combination, a generator, a field regulating resistance therefor, means to establish a motor circuit to be supplied by said generator and means controlled by the former means to exclude a given amount of said generator field resistance when said motor circuit is first established and thereafter to reinclude such resistance subject to a predetermined time delay.

4. In a variable voltage system of motor control, in combination, a generator, field regulating means therefor including a resistance and an electroresponsive relay normally short-circuiting said resistance and having means affording a predetermined time element incident to its response to include said resistance, and means to establish a motor circuit to be supplied by said generator and also to establish an energizing circuit for said relay.

5. In a variable voltage system of motor control, in combination, a generator, field regulating means therefor including a resistance and an electroresponsive relay normally short-circuiting said resistance and having means affording a predetermined time element incident to its response to include said resistance, and means to selectively establish all or any one of a plurality of motor circuits to be supplied by said generator and also to establish an energizing circuit for said relay when establishing all or any one of said motor circuits.

In witness whereof, I have hereunto subscribed my name.

HENRY R. EILERTSEN.